United States Patent [19]

Kashiwagi

[11] 4,286,867
[45] Sep. 1, 1981

[54] LIGHT SOURCE UNIT ASSEMBLY FOR PHOTOGRAPHIC ENLARGER

[75] Inventor: Atumi Kashiwagi, Nara, Japan

[73] Assignee: Fujimoto Photo Industrial Co., Ltd., Osaka, Japan

[21] Appl. No.: 126,720

[22] Filed: Mar. 3, 1980

[51] Int. Cl.³ ............................................. G03B 27/54
[52] U.S. Cl. ...................................... 355/67; 355/35; 362/7; 362/18
[58] Field of Search ................. 355/67, 71, 35; 362/7, 362/17, 18

[56] References Cited

U.S. PATENT DOCUMENTS

| | | | |
|---|---|---|---|
| 3,782,821 | 1/1974 | Bosman | 355/71 |
| 3,892,482 | 7/1975 | Weisglass | 355/71 |
| 4,168,904 | 9/1979 | Furukawa | 355/71 |

Primary Examiner—Monroe H. Hayes
Attorney, Agent, or Firm—Koda and Androlia

[57] ABSTRACT

A light source unit assembly for use in a photographic enlarger on the optical axis of its light source between the light source and a negative comprises a first optical system of the semi-diffused illumination type and a second optical system of the diffused illumination type which are incorporated into a unit and alternatively positionable on the optical axis. A diffusing tube housed in a frame is divided into a diffusing chamber for the first optical system and another diffusing chamber having a larger length than the chamber for the second optical system, by a partition having a light diffusing surface on each of its opposite sides. A light passing aperture is opposed to the diffusing surface. A diffusing filter and a condenser are positioned across the path of the light reflected from one of the diffusing surfaces to provide a secondary light source for the semi-diffused illumination system. Another diffusing filter is similarly positioned for the other diffusing surface to provide a secondary light source for the diffused illumination system. One of the two systems is selectively usable on a single enlarger to achieve the desired results.

7 Claims, 14 Drawing Figures

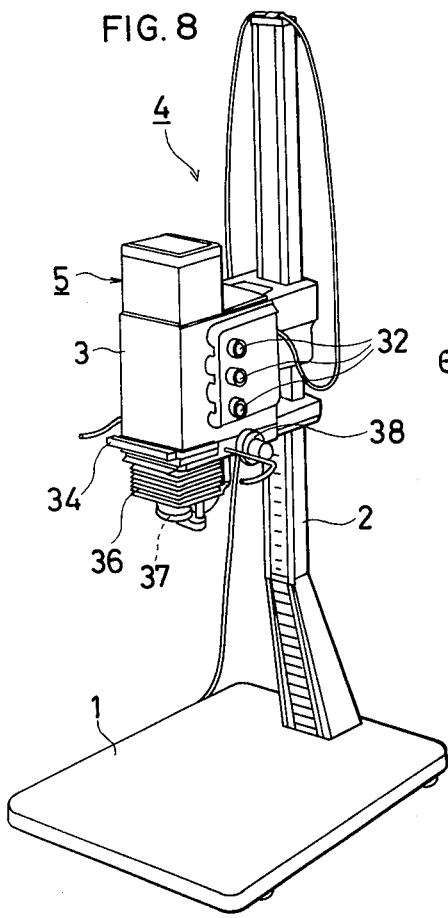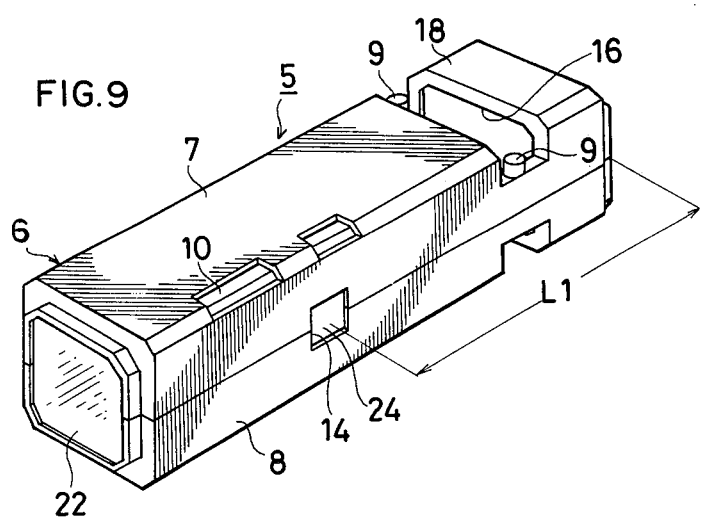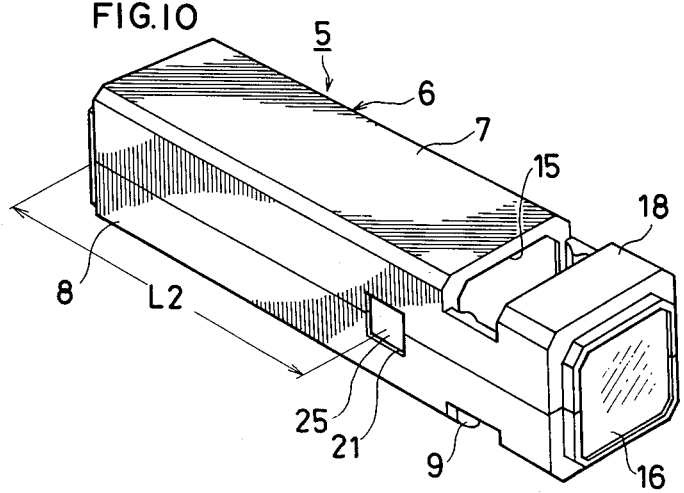

LIGHT SOURCE UNIT ASSEMBLY FOR PHOTOGRAPHIC ENLARGER

BACKGROUND OF THE INVENTION

The present invention relates to a light source device for photographic enlargers, and more particularly to a light source unit assembly comprising two types of optical systems one of which is alternatively positionable on the optical axis between a light source and the negative for giving prints of increased or reduced contrast.

Photographic enlargers include an optical element disposed on the optical axis between the light source and the negative for diffusing the rays from the light source and illuminating the negative. Enlarger illumination systems are divided into three general types: diffused illumination, semi-diffused illumination and converged or direct illumination.

With the diffused illumination system, the negative is illuminated with rays diffused in all directions, and only some of the rays fall on the enlarger lens and act effectively for printing. Since the negative is illuminated in all directions with the other rays which are wasted, this system affords prints of soft contrast. Accordingly slight scratches on the negative will not be reproduced in the print. The system is suitable chiefly for enlarging color negatives.

On the other hand, the semi-diffused (or converged-diffused) illumination system is basically adapted to concentrate negative illuminating rays on the enlarger lens with a condenser. The system employs a large diffused light source, such as an opal bulb, is unaffected by variations in the focal distance of the enlarger lens and affords contrasty prints.

Thus the semi-diffused illumination system is best suited to black-and-white photographs which require sharp contrast between black and white. However this system, although usable for color negatives, has the drawback that scratches on the negative become more obvious in the print.

The enlarger light source element for color photography therefore basically differs from the light source element for black-and-white photography, whereas many of amateurs in photography usually use an enlarger of the semi-diffused illumination type or the diffused illumination type only chiefly for economical reasons and are unable to achieve the desired result that otherwise would be fully attained.

SUMMARY OF THE INVENTION

The present invention has been accomplished in view of the foregoing situation. An object of the invention is to provide a light source assembly comprising an optical system of the diffused illumination type and an optical system of the semi-diffused illumination type which are incorporated into a unit as a light source element for a single photographic enlarger and which are alternatively positionable on the optical axis between the light source and the negative so as to achieve the desired photographic effect.

Another object of the invention is to provide a light source assembly comprising an optical system of the diffused illumination type and an optical system of the semi-diffused illumination type which are incorporated into a rectangular parallelepipedal frame as a unit and which are alternatively usable easily for diffused illumination or semi-diffused illumination without necessitating replacement or addition of any part and further without disturbing the balance of the enlarger.

Another object of the invention is to provide a light source unit assembly which is light, assures uniform illumination and permits compact design of the enlarger in its entirety.

Other features and advantages of the invention will become apparent from the following description of embodiments given for illustrative purposes only with reference to the accompanying drawings.

BRIEF DESCRIPTION OF THE DRAWINGS

FIG. 8 is an overall perspective view of a photographic enlarger equipped with a light source unit assembly according to a second embodiment of the invention;

FIGS. 9 and 10 are perspective views showing the light source unit assembly according to the second embodiment as it is seen in different directions;

DETAILED DESCRIPTION OF THE INVENTION

Figure 1:
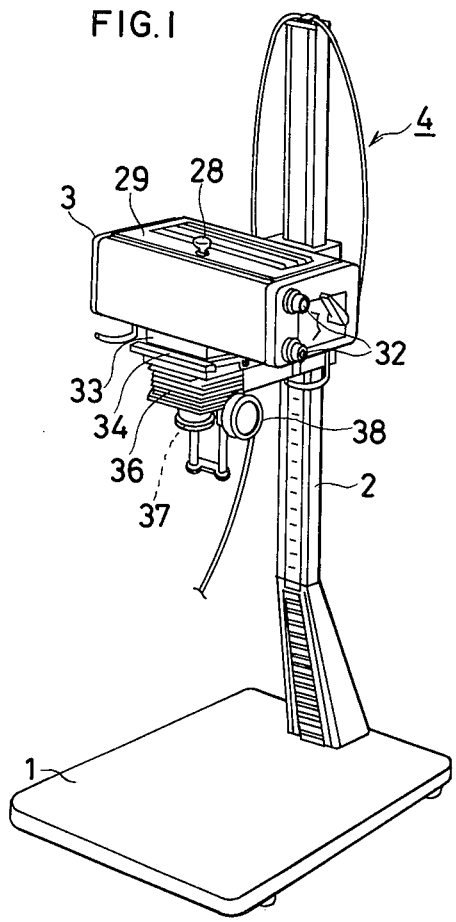
FIG. 1 is an overall perspective view of a photographic enlarger equipped with a light source unit assembly according to a first embodiment of the invention.

FIG. 1 shows a well known photographic enlarger 4 comprising a baseboard 1, a post 2 and a lamphouse 3 vertically movably held to the post 2. A light source unit assembly 5, which is a first embodiment of the invention, is accommodated in the lamphouse 3.

The first embodiment will be described in detail with reference to FIGS. 2 to 7.

Figure 6:
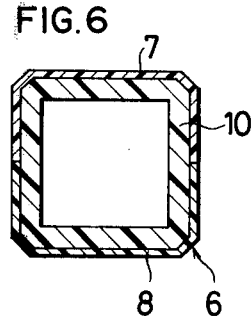
FIG. 6 is a view in section taken along the line 6—6 in FIG. 2.
Figure 7:
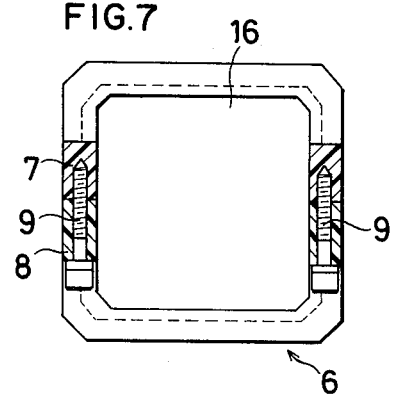
FIG. 7 is a view in section taken along the line 7—7 in FIG. 3.
Figure 11:
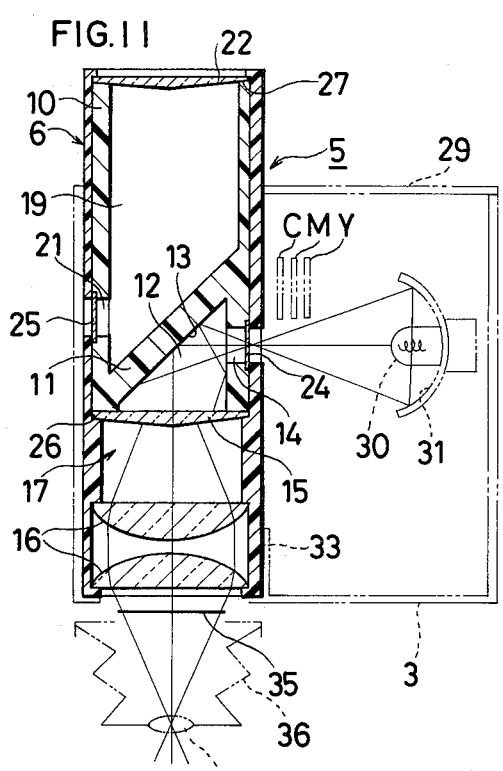
FIG. 11 is a sectional view showing the light source unit assembly according to the second embodiment partly schematically as it is used for semi-diffused illumination.
Figure 12:
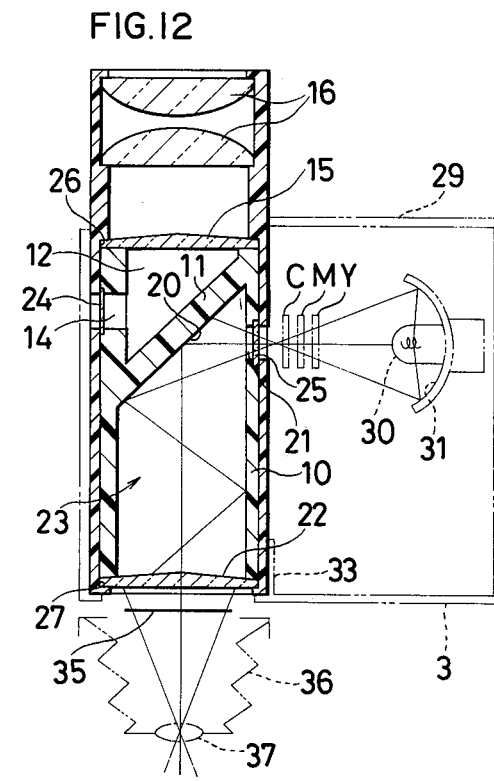
FIG. 12 is a sectional view showing the same assembly partly schematically as it is in use for diffused illumination.

FIGS. 2 to 5 show a frame 6 composed of segments 7 and 8 molded from heat-resistant hard resin, such as urea resin. The segments 7 and 8 are fitted together to provide a tube of square to rectangular cross section as shown in FIGS. 6 and 7. The fitted portions are joined together, for example, with slender screws 9 as seen in FIG. 7.

As shown in FIG. 6, the frame 6 houses a light diffusing tube 10 of rectangular cross section. The diffusing tube 10 is made of resin, such as white foamed styrol resin having a foaming degree of 20 to 50, to provide an inner surface that will cause diffused reflection.

The diffusing tube 10 has a partition 11 obliquely extending across the interior thereof to divide the interior into two, namely, into first and second diffusing chambers 12 and 19. According to the preferred embodiment shown in FIGS. 4 and 5, the partition 11 is molded integrally with the diffusing tube 10.

Although unillustrated, the partition 11 may alternatively be made separately from the diffusing tube 10 so as to be insertable into or withdrawable from grooves formed in the tube 10.

The first diffusing chamber 12 is provided with a first light diffusing surface 13 provided by one face of the partition 11, a light passing aperture 14 positionable on the optical axis of a light source and opposed to the diffusing surface 13, and a first diffusing filter 15 detachably mounted on the frame 6 and disposed across the path of the light reflected from the first diffusing surface 13. The first diffusing chamber 12 of the first embodiment is in the form of a prism having a triangular cross section.

Figure 4:
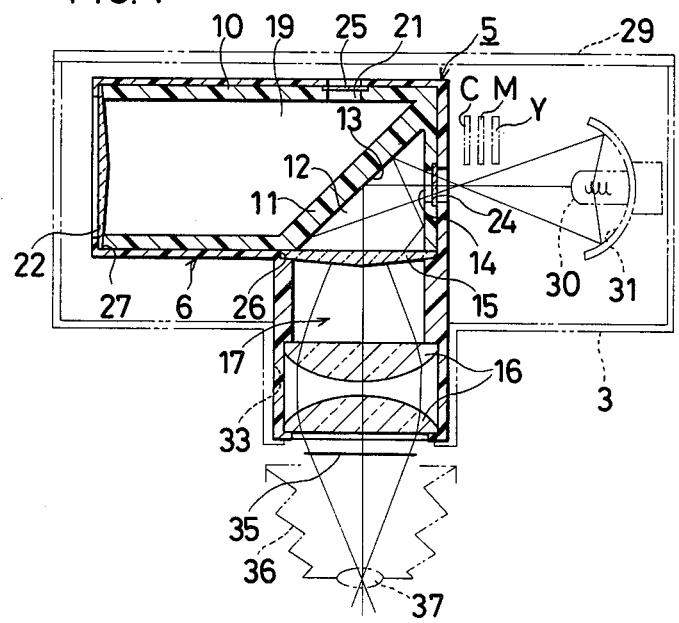
FIG. 4 is a sectional view showing the light source unit assembly partly schematically as it is used for semi-diffused illumination.
Figure 5:
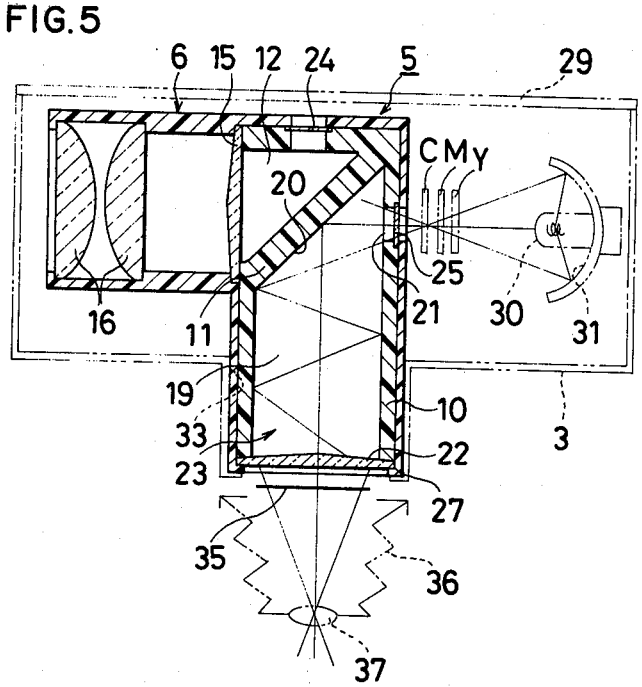
FIG. 5 is a sectional view showing the same partly schematically as it is in use for diffused illumination.

A detachable condenser 16 made up of two lenses as seen in FIGS. 4 and 5 is positioned on the optical axis of the first diffusing filter 15 as spaced apart from the filter in opposed relation thereto. The first light passing aperture 14, the first diffusing chamber 12, and the first diffusing filter 15 and the condenser 16 serving as secondary light source means provide a first optical system 17.

Figure 2:
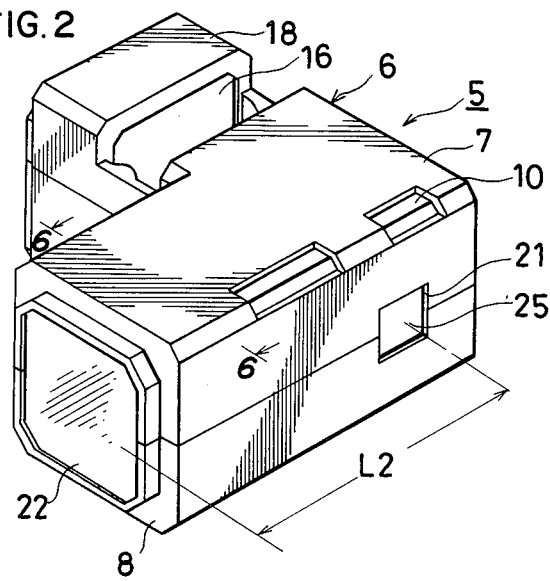
FIGS. 2 and 3 are perspective views showing the light source unit assembly as it is seen in different directions.
Figure 3:
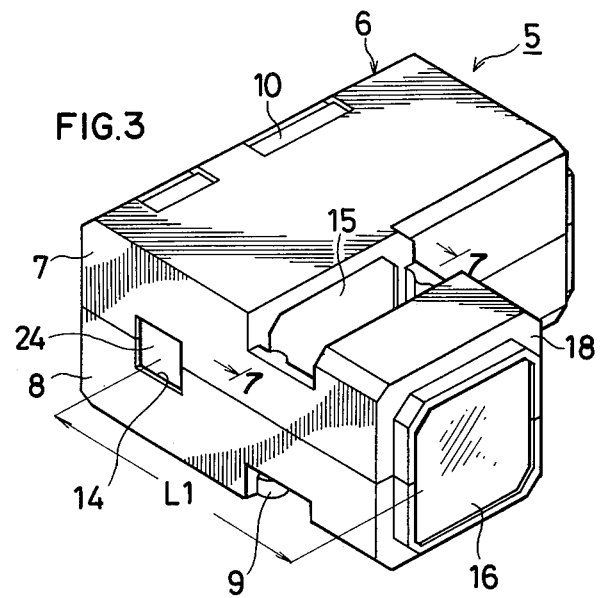

The condenser 16 is fitted in an extension 18 extending from the frame 6 holding the diffusing tube 10 therein, the extension 18 being at right angles to the axis of the tube 10. The condenser 16 and the filter 15 are positioned substantially in parallel to the axis of the diffusing tube 10. Thus the light source unit assembly 5 including the frame 6 is in the form of an L-shaped rectangular parallelepiped as shown in FIGS. 2 and 3.

The second diffusing chamber 19, namely, the other chamber of the tube 10 separated by the partition 11 has a larger length than the first diffusing chamber 12 as seen in FIGS. 4 and 5.

The second diffusing chamber 19 has a second light diffusing surface 20 provided by the other face of the partition 11, a second light passing aperture 21 positionable on the optical axis of the light source and opposed to the second diffusing surface 20 as seen in FIG. 5, and a second diffusing filter 22 detachably mounted on the frame 6 substantially at one end of the tube 10 and disposed across the path of the light reflected from the second diffusing surface 20. These elements substantially provide a second optical system as illustrated in FIG. 5.

The frame 6 has apertures formed in its wall portions facing the first and second light passing apertures 14 and 21 and identical to these apertures in shape and size. The apertures 14 and 21 are detachably covered with filters 24 and 25 respectively made of milk-white acrylic resin or frosted glass for blocking ultraviolet rays. These filters provide protection against dust and serve to diffuse and control the light from the light source. In the illustrated embodiment, the filters 24 and 25 are made of frosted glass.

The filters 15 and 22 are made of milk-white acrylic resin, frosted glass or the like and fitted in grooves 26 and 27, respectively, defined by the outer surface of the diffusing tube 10 and the inner surface of the frame 6. Preferably the filters 15 and 22 have an increased thickness in its center.

The light source unit assembly 5 according to the first embodiment described is placed into the lamphouse 3 through the top opening thereof which is usually closed with a detachable lid 29 openable by a knob 28 as seen in FIG. 1.

The lamphouse 3 has accommodated therein a light source 30, a reflector 31 and color adjusting filters C, M, Y disposed at the position where rays are collected by the reflector. The filters C, M, Y are positionable on the optical axis by a knob 32 (FIG. 1) through unillustrated coupling means.

As seen in FIGS. 4 and 5, the lamphouse 3 has a portion 33 for holding the assembly 5 and a carrier 34 (FIG. 1) provided at the lower end of the holding portion 33 for removably positioning the negative 35 (FIGS. 4 and 5) on the optical axis. The lamphouse 3 is further provided with an enlarging lens 37 with a light blocking bellows 36 therebetween. The lens 37 is vertically movable by a knob 38, etc. shown in FIG. 1.

When the first optical system 17 is to be used for semi-diffused illumination as shown in FIG. 4, the lid 29 is removed, and the light source unit assembly 5 is placed on the optical axis between the light source 30 and the negative 35, with the extension 18 of the frame 6 fitted in the holding portion 33 of the lamphouse 3 and with the first aperture 14 positioned on the optical axis of the light source.

The light from the light source 30 is collected by the reflector 31 and thereafter diffused. When passing through the first aperture 14, the light is further diffused and adjusted by the filter 24 provided for the aperture 14 and is reflected from the first diffusing surface 13. The light diffused and reflected in the first chamber 12 illuminates the first diffusing filter 15.

The light through the first filter 15 serving as a secondary light source for the first optical system 17 passes through the condenser 16, which concentrates the light on the enlarging lens 37. The lens 37 projects the image on the negative 35 onto an unillustrated easel mask on the baseboard 1 shown in FIG. 1.

Thus the light provided by the first optical system 17 for illuminating the negative 35 is basically concentrated by the condenser 16 on the lens 37 as seen in FIG. 4, giving contrasty prints since the negative will not be illuminated with diffused rays obliquely.

The arrangement enables the first filter 15 to have an increased area for use as the secondary light source. This serves to reduce the influence that would result from variations in the focal length of the enlarging lens 37 or from the shift of the lens 37 for focusing, consequently assuring uniform illumination. The first filter 15, which has an increased thickness in its center, also serves to correct irregularities in illumination.

The assembly used for semi-diffused illumination in the manner described above with reference to FIG. 4 will be changed over for diffused illumination in the following manner.

The lid 29 is removed from the lamphouse 3, and the assembly 5 is withdrawn from the lamphouse 3 and then turned in such a direction that the light passing aperture 21 for the second optical system 23 will be positioned on the optical axis of the light source, with the second filter 22 directed toward the negative 35. The frame 6 is fitted into the holding portion 33 of the lamphouse 3 as seen in FIG. 5. Accordingly the holding portion 33 may preferably be provided with a guide for inserting the assembly 5 into place.

Apparently the light source 30 in the lamphouse 3 and the negative 35 are in a fixed position, so that the length L1 of the first optical system 17 from the condenser 16 to the first aperture 14 shown in FIG. 3 is made equal to the length L2 of the second optical system 23 from the second filter 22 to the second aperture 21 shown in FIG. 2. It is desired that the portions of the frame 6 to be fitted into the holding portion 33 be identical in external dimensions.

With the second optical system 23 shown in FIG. 5, the light passing through the filter 25 at the aperture 21 and thereby adjusted strikes the second diffusing surface 20. The light reflected from the surface 20 is further diffused and reflected in the second diffusing chamber 19. Since the diffusing chamber 19 is defined by an elongated tube of rectangular cross section, the light can be diffused effectively to illuminate the filter 22.

The second filter 22, like that of the first optical system 17, serves as a secondary light source for giving highly diffused rays to directly illuminate the negative 35, whereby the image on the negative is projected via the enlarging lens 37 onto the unillustrated easel mask on the baseboard 1. The prints obtained are of softer contrast.

For the enlarging operation described, the lamphouse 3 is suitably movable on the post 2 vertically, while the position of the enlarging lens 37 is also vertically adjustable by the knob 38. When color adjustment is needed for color photography, the corrections filters C, M, Y are positionable on the optical axis.

FIGS. 8 to 12 show a second embodiment which is common to the first embodiment in basic construction and basic components, so that the difference alone will be described with like parts referred to by like numerals.

The diffusing filter 15 and condenser 16 for the first optical system 17, and the diffusing filter 22 for the second optical system 23 are aligned on the axis of a diffusing tube 10 in opposed relation. The light source unit assembly 5 including a frame 6 is in the form of a rectangular parallelepiped as shown in FIGS. 9 and 10. As is the case with the first embodiment, the diffusing tube 10 is divided by a partition 11 disposed preferably at an angle of 45 degrees and having first and second light diffusing surfaces 13 and 20. In opposed relation to the surfaces 13 and 20 are light passing apertures 14 and 21 formed in the tube 10 and similar apertures formed in the frame 6.

Since the light source unit assembly 5 of the second embodiment can be accommodated in a vertical position within a lamphouse 3 as seen in FIG. 8, the second embodiment is advantageous over the first in that the lamphouse 3 can be designed compactly widthwise thereof. Since the lamphouse 3 is vertically movable, the vertical position of the assembly 5 will present no difficulty in alternatively using the first and second optical systems 17 and 23 as positioned on the optical axis between the light source 30 and the negative 35 shown in FIGS. 11 and 12.

Figure 13:
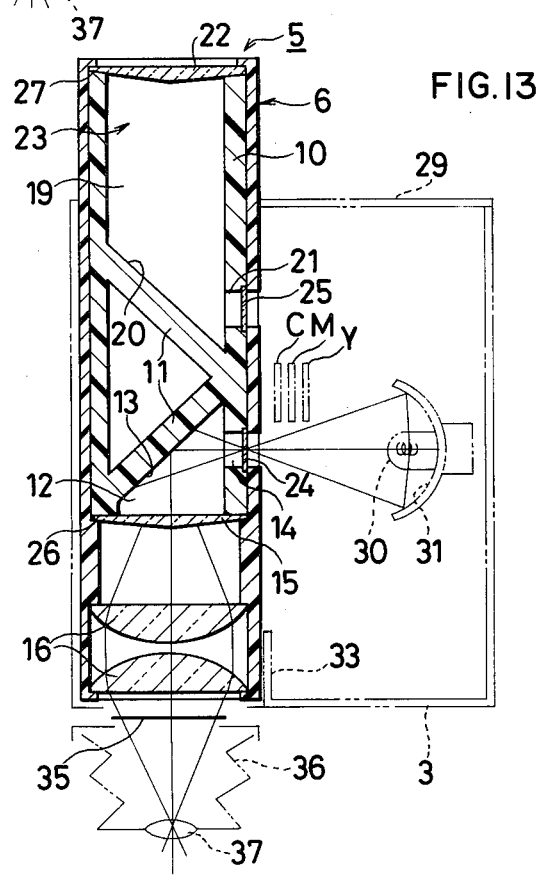
FIG. 13 is a sectional view showing a light source unit assembly according to a third embodiment of the invention as it is used for semi-diffused illumination, the assembly being shown partly schematically.
Figure 14:
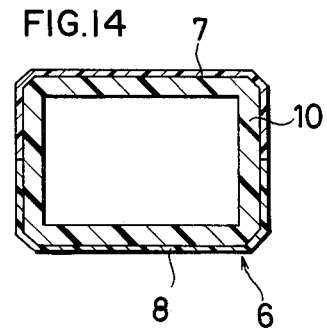
FIG. 14 is a sectional view corresponding to FIG. 6 and showing a modified light diffusing tube.

FIG. 13 shows a third embodiment as a modification of the second embodiment. The third has the same construction as the second except that the partition 11 is triangular in section (hollow or solid) and that the light passing apertures 14 and 21 are provided on the same side. Accordingly like parts are referred to by like reference numerals.

The first to third embodiments described above have the basic features of the invention and can therefore be modified as desired. For instance, the diffusing tube 11 may be of rectangular, hexagonal or some other geometric shape in cross section although not shown.

To sum up, the light source unit assembly 5 of this invention comprises a frame 6 having a diffusing tube 10 at least in its interior and a partition 11 provided in the frame 6 and dividing the interior of the diffusing tube 10 into a first diffusing chamber 12 and a second diffusing chamber 19. The first diffusing chamber 12 has a first light diffusing surface 13 on the partition 11, a first light passing aperture 14 positionable on the optical axis of the light source 30 and opposed to the first diffusing surface 13, a first diffusing filter 15 disposed across the path of light reflected from the first diffusing surface 13 and a condenser 16 positioned on the optical axis of the first diffusing filter 15 and spaced apart from the filter 15 to provide a first optical system 17. The second diffusing chamber 19 has a second light diffusing surface 20 on the partition 11, a second light passing aperture 21 positionable on the optical axis of the light source 30 and opposed to the second diffusing surface 20 and a second diffusing filter 22 disposed across the path of light reflected from the second diffusing surface 20. One of the first and second optical systems 17 and 23 is selectively positionable on the optical axis of the light source 30 between the source 30 and the negative 35. The assembly therefore has the following advantages.

The assembly, when oriented differently, is usable for semi-diffused illumination or diffused illumination alternatively to afford prints of proper contrast, hard or soft, as desired.

The assembly 5 is usable for semi-diffused or diffused illumination even on a single enlarger body without necessitating replacement or addition of any part whatever. The device is easy to operate and inexpensive to manufacture. Despite the selective use of the two optical systems, the assembly does not involve any variation in its weight and is therefore best suited for use in photographic enlargers in which the lamphouse assembly must be vertically movable in balance.

What is claimed is:

1. In an optical element for use in a photographic enlarger positioned on the optical axis of a light source between the light source and a negative for diffusing the light from the light source and illuminating the negative, a light source unit assembly comprising a frame having a diffusing tube at least in its interior and a partition provided in the frame and dividing the interior of the diffusing tube into a first diffusing chamber and a second diffusing chamber; the first diffusing chamber having a first light diffusing surface on the partition, a first light passing aperture positionable on the optical axis of the light source and opposed to the first diffusing surface, a first diffusing filter disposed across the path of light reflected from the first diffusing surface and a condenser positioned on the optical axis of the first diffusing filter and spaced apart from the filter to provide a first optical system; the second diffusing chamber having a second light diffusing surface on the partition, a second light passing aperture positionable on the optical axis of the light source and opposed to the second diffusing surface and a second diffusing filter disposed across the path of light reflected from the second diffusing surface; the first and second optical systems being alternatively positionable on the optical axis of the light source between the light source and the negative.

2. A light source unit assembly as defined in claim 1 wherein each of the first and second light passing apertures is provided with a filter for blocking ultraviolet rays, and each of the first and second diffusing filters has an increased thickness in its center.

3. A light source unit assembly as defined in claim 1 wherein the first filter and the condenser of the first optical system and the second diffusing filter of the second optical system are aligned on the axis of the diffusing tube in opposed relation to each other, and the frame is in the form of a rectangular parallelepiped.

4. A light source unit assembly as defined in claim 1 wherein the first diffusing filter and the condenser of the first optical system are arranged in parallel with the axis of the diffusing tube, and the second diffusing filter of the second optical system is positioned on the axis of the diffusing tube, the frame being in the form of an L-shaped rectangular parallelepiped.

5. A light source unit assembly as defined in claims 3 or 4 wherein the diffusing tube has a rectangular cross section, and the second diffusing chamber has a larger length than the first diffusing chamber.

6. A light source unit assembly as defined in claim 1 wherein the partition having the light diffusing surfaces on its opposite sides is molded from white foamed styrol integrally with the diffusing tube, and the frame comprises heat-resistant hard segments and has the partition detachably provided therein.

7. A light source unit assembly as defined in claim 5 wherein the partition having the light diffusing surfaces on its opposite sides is molded from white foamed styrol integrally with the diffusing tube, and the frame comprises heat-resistant hard segments and has the partition detachably provided therein.

* * * * *